No. 643,875. Patented Feb. 20, 1900.
D. N. JORDAN & F. A. CROWELL.
VEHICLE TIRE.
(Application filed July 3, 1899.)
(No Model.)
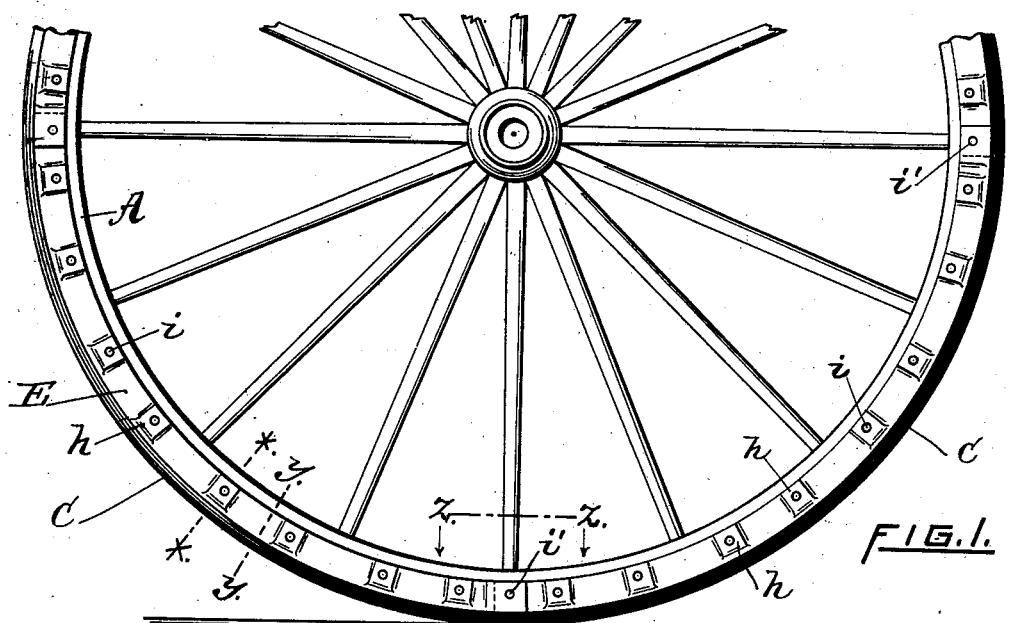
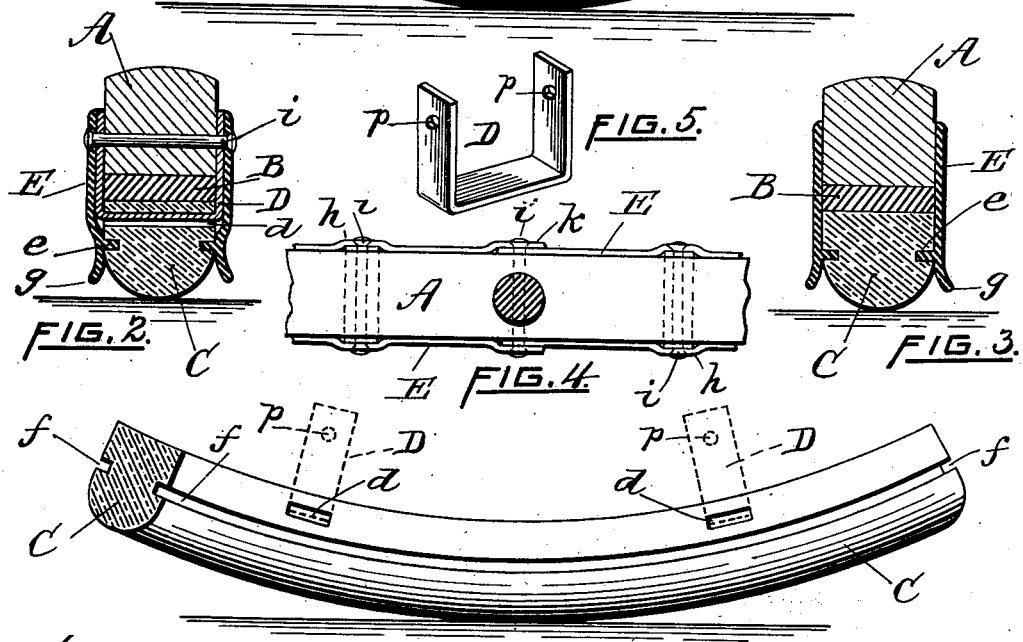
WITNESSES,
Isaac N. Lincoln
Victor De la Barre
INVENTORS
David N. Jordan.
Frank A. Crowell.
By Charles T. Hannigan
Atty.

UNITED STATES PATENT OFFICE.

DAVID N. JORDAN, OF PROVIDENCE, RHODE ISLAND, AND FRANK A. CROWELL, OF ATTLEBOROUGH, MASSACHUSETTS.

VEHICLE-TIRE.

SPECIFICATION forming part of Letters Patent No. 643,875, dated February 20, 1900.

Application filed July 3, 1899. Serial No. 722,749. (No model.)

*To all whom it may concern:*

Be it known that we, DAVID N. JORDAN, residing in the city and county of Providence and State of Rhode Island, and FRANK A. CROWELL, residing in the town of Attleborough, county of Bristol, and State of Massachusetts, citizens of the United States, have invented certain new and useful Improvements in Vehicle-Tires, of which the following is a specification.

This invention relates to means for securing rubber tires to the wheels of vehicles, such as constructed with the usual wooden rim having a flat metal tire.

It consists in the combination, with the rim of a wheel of the character designated, of a solid-rubber tire having a flat interior surface and provided with longitudinal slots formed transversely through its thickness and close to the said interior surface and further provided with a circular groove formed laterally in each side thereof and outwardly from said slots, a thin metallic clip in each of said slots having its projecting ends bent vertically with a perforation near each extremity thereof, a circular annular flange located upon each side of the rubber tire and having a laterally-projecting circular flange to enter the grooves of the same, said annular flange closing over the extended portions of the clips, with means for securing the said parts to the rim of the wheel, as hereinafter described.

Figure 1 represents a partial side elevation of a vehicle-wheel embodying our invention. Fig. 2 is an enlarged cross-sectional view taken in line $x$ $x$ of the same. Fig. 3 is a similar sectional view taken in line $y$ $y$ of Fig. 1. Fig. 4 is a top plan view taken in line $z$ $z$ of Fig. 1. Fig. 5 is a perspective view of the clip. Fig. 6 represents a partial side elevation of the rubber tire, showing the relative position of the clips in dotted position on the same.

Letters of reference correspond to similar parts in the drawings.

A designates the wooden rim of a vehicle-wheel, and B the metal tire therefor, these parts being of the usual construction.

C is the solid-rubber tire, having its tread or outer surface semicircular in cross-sectional form and its inner surface made flat. Said tire is provided with longitudinal slots $d$, molded in the rubber and extending transversely through the same from each side thereof and close to the inner surface of the tire, and each and all of said slots are divided equidistant from each other around the tire. Said tire is further provided with circular grooves $f$ $f$, molded in each side of the rubber above the slots $d$, and completes the construction of the tire.

D is a thin metallic clip adapted to be inserted within each of the longitudinal slots $d$ of the rubber tire and having its projecting end portions bent vertically from the outer surface of the same and provided with a perforation $p$ near each extremity thereof.

E E represent circular annular flanges located upon each side of the rubber tire and having laterally-projecting circular flanges $e$ $e$, which enter the corresponding grooves $f$ $f$ in said tire. The outer edges of the annular flanges flare slightly outward, as shown at $g$, to form a guard to protect the tread portion of the rubber in the manner as illustrated in Fig. 3. These side flanges may be made of malleable cast metal having outward depressions $h$, forming pockets to inclose the vertical sides of the clips and terminating with the inner edges thereof, said annular flanges provided with perforations corresponding in size and location with the perforations in the clips.

To apply the aforesaid construction of parts to the wheel of a vehicle, the projecting edges of the iron tire B are first ground flush with the sides of the wooden rim A, after which the rubber-tire is placed in position thereon and conforming in width to the face of the metal rim. The thin flat strips forming clips D are then inserted within the slots $d$, and the projecting ends being of sufficient length that when the same is bent vertically they each extend in length to nearly the depth of the wooden rim, as seen in Fig. 2. The rubber tire thus applied to the wheel is secured against lateral displacement by means of the annular flange having laterally-projecting circular flanges which enter the grooves of said tire, the whole being secured to the wood rim by bolts $i$, which pass through the perforations made in the flanges E and clips D, respectively, said bolts having their projecting ends riveted over upon the outer side of said flanges, thus firmly securing the parts together. These annular flanges are constructed in four parts, each section overlapping the other, as shown at k of Fig. 4, and the ends connected together by a bolt.

Having described our invention, what we claim as new, and desire to secure by Letters Patent, is—

1. In combination with the wheel of a vehicle provided with a metal tire, of a solid-rubber tire having a flat inner surface and provided with a series of longitudinal slots molded laterally from either side thereof and close to its inner surface and a circular groove molded on each side and beyond said series of slots, a thin metallic strip in each of said slots and having its projecting end portions bent to overlap the sides of the wood rim with a perforation near each extremity thereof, an annular flange having a laterally-projecting flange adapted to enter the grooves of the tire, said annular flanges having outward depressions forming pockets adapted to inclose the extended side portions of the strips with perforations corresponding in size and location to the perforations in the same, a bolt passing through said perforations and through the wood rim for securing the parts together, as shown and described.

2. The herein-described vehicle-tire, consisting of the rubber tire A having a flat inner surface and provided with slots d passing through from either side thereof and a circular groove f formed on each side of the tire and beyond said slots, in combination therewith, of the metallic strip D adapted to enter each of said slots in the tire and having its projecting end portions bent vertically with a perforation near each extremity thereof, the side annular flanges E E having circular projecting flanges e e adapted to enter the grooves of the tire, said annular flanges having outward depressions h and perforations corresponding in size and location with the perforations in the metallic strip, with the bolt for securing the parts together to the wood rim of the wheel, as shown and described.

Signed by us at Providence, Rhode Island, this 21st day of July, A. D. 1899.

DAVID N. JORDAN.
FRANK A. CROWELL.

Witnesses:
ISAAC N. LINCOLN,
VICTOR DE LA BARRE.